(12) United States Patent
Ali et al.

(10) Patent No.: US 8,602,156 B2
(45) Date of Patent: Dec. 10, 2013

(54) MULTI-SPLICE ACOUSTIC LINER

(75) Inventors: Amr Ali, Windsor, CT (US); Yuan J. Qiu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 2046 days.

(21) Appl. No.: 11/437,466

(22) Filed: May 19, 2006

(65) Prior Publication Data
US 2007/0267246 A1  Nov. 22, 2007

(51) Int. Cl.
*B64D 33/02*  (2006.01)

(52) U.S. Cl.
USPC ........... 181/214; 181/210; 181/212; 415/119; 244/1 N; 244/53 B

(58) Field of Classification Search
USPC ........... 181/214, 210, 312; 415/119; 244/1 N, 244/53 B
See application file for complete search history.

(56) References Cited

U.S. PATENT DOCUMENTS

| | | | | | |
|---|---|---|---|---|---|
| 3,819,008 | A | * | 6/1974 | Evans et al. | 181/214 |
| 3,937,590 | A | * | 2/1976 | Mani | 415/119 |
| 3,947,148 | A | * | 3/1976 | Holt | 415/119 |
| 4,086,022 | A | * | 4/1978 | Freeman et al. | 415/119 |
| 4,104,002 | A | * | 8/1978 | Ehrich | 415/119 |
| 4,132,240 | A | * | 1/1979 | Frantz | 137/15.1 |
| 4,161,231 | A | * | 7/1979 | Wilkinson | 181/292 |
| 5,520,508 | A | * | 5/1996 | Khalid | 415/119 |
| 5,649,419 | A | * | 7/1997 | Schaut | 60/226.1 |
| 6,139,259 | A | * | 10/2000 | Ho et al. | 415/119 |
| 6,379,110 | B1 | * | 4/2002 | McCormick et al. | 415/119 |
| 6,409,469 | B1 | * | 6/2002 | Tse | 415/119 |
| 6,435,819 | B2 | * | 8/2002 | Irie et al. | 415/119 |
| 6,439,340 | B1 | * | 8/2002 | Shirvan | 181/213 |
| 6,554,564 | B1 | * | 4/2003 | Lord | 415/119 |
| 6,582,189 | B2 | * | 6/2003 | Irie et al. | 415/119 |
| 6,599,085 | B2 | * | 7/2003 | Nadeau et al. | 415/119 |
| 6,761,245 | B2 | * | 7/2004 | Porte | 181/210 |
| 6,764,276 | B2 | * | 7/2004 | Mulcaire et al. | 415/119 |
| 6,827,180 | B2 | * | 12/2004 | Wilson | 181/292 |
| 6,881,029 | B2 | * | 4/2005 | Le Biez et al. | 415/173.4 |
| 6,896,099 | B2 | * | 5/2005 | Porte et al. | 181/214 |
| 6,935,835 | B2 | * | 8/2005 | Della Mora | 415/119 |
| 7,029,227 | B2 | * | 4/2006 | Berthillier et al. | 415/1 |

(Continued)

FOREIGN PATENT DOCUMENTS

| | | |
|---|---|---|
| EP | 1398473 | 3/2004 |
| GB | 2064412 | 6/1981 |
| WO | 02/42623 | 5/2002 |

OTHER PUBLICATIONS

Extended European Search Report mailed Feb. 27, 2009.

*Primary Examiner* — Forrest M Phillips
(74) *Attorney, Agent, or Firm* — Carlson, Gaskey & Olds, P.C.

(57) ABSTRACT

A liner assembly for an aircraft engine housing includes a noise attenuation structure that is covered by a face sheet. The face sheet covering the noise attenuation structure includes a surface having a plurality of circumferentially spaced apart acoustic energy absorption areas that are interspersed between a corresponding plurality of acoustic energy reflective areas. The acoustic energy reflective areas scatter higher order acoustic modes into a plurality of lower order modes. The difficult to attenuate lower order acoustic modes produced by the various acoustic energy cancel each other out to provide significant improvement in liner noise reduction efficiency.

4 Claims, 2 Drawing Sheets

(56) References Cited

U.S. PATENT DOCUMENTS

| | | | |
|---|---|---|---|
| 7,085,388 B2 * | 8/2006 | Butler et al. | 381/71.3 |
| 7,104,752 B2 * | 9/2006 | Matheny et al. | 415/119 |
| 7,296,655 B2 * | 11/2007 | Costa et al. | 181/210 |
| 7,296,656 B2 * | 11/2007 | Sanicki et al. | 181/210 |
| 7,311,175 B2 * | 12/2007 | Proscia et al. | 181/290 |
| 7,328,771 B2 * | 2/2008 | Costa et al. | 181/214 |
| 2002/0079158 A1 * | 6/2002 | Liu | 181/210 |
| 2003/0141144 A1 * | 7/2003 | Wilson | 181/292 |
| 2004/0045765 A1 * | 3/2004 | Porte | 181/210 |
| 2004/0045766 A1 * | 3/2004 | Porte et al. | 181/210 |
| 2005/0194205 A1 * | 9/2005 | Guo | 181/210 |
| 2006/0029493 A1 * | 2/2006 | Schwaller et al. | 415/119 |
| 2006/0169532 A1 * | 8/2006 | Patrick | 181/210 |
| 2006/0237260 A1 * | 10/2006 | Costa et al. | 181/210 |
| 2006/0237261 A1 * | 10/2006 | Sanicki et al. | 181/210 |
| 2007/0102234 A1 * | 5/2007 | Prasad et al. | 181/214 |
| 2007/0267246 A1 * | 11/2007 | Ali et al. | 181/214 |

\* cited by examiner

MULTI-SPLICE ACOUSTIC LINER

BACKGROUND OF THE INVENTION

This invention generally relates to liners for aircraft engines. More particularly, this invention relates to an acoustic liner including acoustically inactive areas for attenuating noise generated by an aircraft engine.

An aircraft engine typically includes a plurality of fan blades that rotate within an engine case. The engine case includes an acoustically active lining forward of the fan blades to reduce the level of noise emitted from the aircraft engine. Conventional acoustic linings include a face sheet covering a honeycomb structure. Acoustic energy generated by rotation of the fan blades is transmitted through a plurality of openings in the face sheet to the honeycomb structure where the acoustic energy dissipates to provide an overall noise reduction.

Openings in the face sheet provide for the transfer of acoustic energy into the honeycomb structure. Therefore conventional acoustic liners are arranged to minimize splices, seams and other disruptions that prevent transmission of acoustic energy through the face sheet and scatter the noise energy into lower order acoustic modes that are difficult to attenuate by the liner. However, a splice free face sheet or honeycomb structure is not practical and minimizing the area of a splice or acoustically dead area of an acoustic liner requires efforts that in many instances are disproportionate to any realized benefits.

Accordingly, it is desirable to develop and design an acoustic liner that provides improved sound attenuating characteristics without the need to minimize or eliminate acoustically inactive zones.

SUMMARY OF THE INVENTION

A liner assembly for an aircraft engine housing includes a noise attenuation structure that is covered by a face sheet including a plurality of noise energy absorption areas that are interspersed between a plurality of noise reflective areas. The noise reflective areas scatter higher order acoustic modes into either a plurality of lower order acoustic modes that tend to cancel each other, or even higher order modes that are easier to attenuate. Scattering caused by splices in the honeycomb structure can be reduced in a similar manner by aligning the honeycomb splices directly under the splices in the face sheet.

An example aircraft engine housing includes an acoustic liner assembly disposed forward of rotating fan blades. The number and configuration of rotating fan blades is utilized to determine the number of noise reflective areas within the face sheet. The noise energy absorption areas include a plurality of openings for transmitting acoustic energy through to a noise attenuation layer. Acoustic energy of higher modes is attenuated by the noise attenuation structure.

Acoustic waves of higher modes are scattered into lower modes by splices or noise reflective areas. Acoustic waves of lower modes are not efficiently attenuated by the noise attenuation layer and therefore propagate through the liner assembly away from an inner surface. By introducing a large number of splices, the lower order mode noise can be substantially eliminated. An example liner assembly of this invention includes a plurality of noise reflective areas without openings. Each of the plurality of noise reflective areas scatters acoustic waves of higher modes into lower modes. The plurality of acoustic waves of lower modes cancels each other out, thereby reducing propagation of difficult to attenuate low order modes.

Accordingly, an example housing assembly according to this invention includes a plurality of noise reflective areas that substantially reduce splice scattered noise without the difficulties accompanying fabrication of a completely acoustically active and absorptive liner assembly.

These and other features of the present invention can be best understood from the following specification and drawings, the following of which is a brief description.

DETAILED DESCRIPTION OF THE PREFERRED EMBODIMENT

Figure 1:
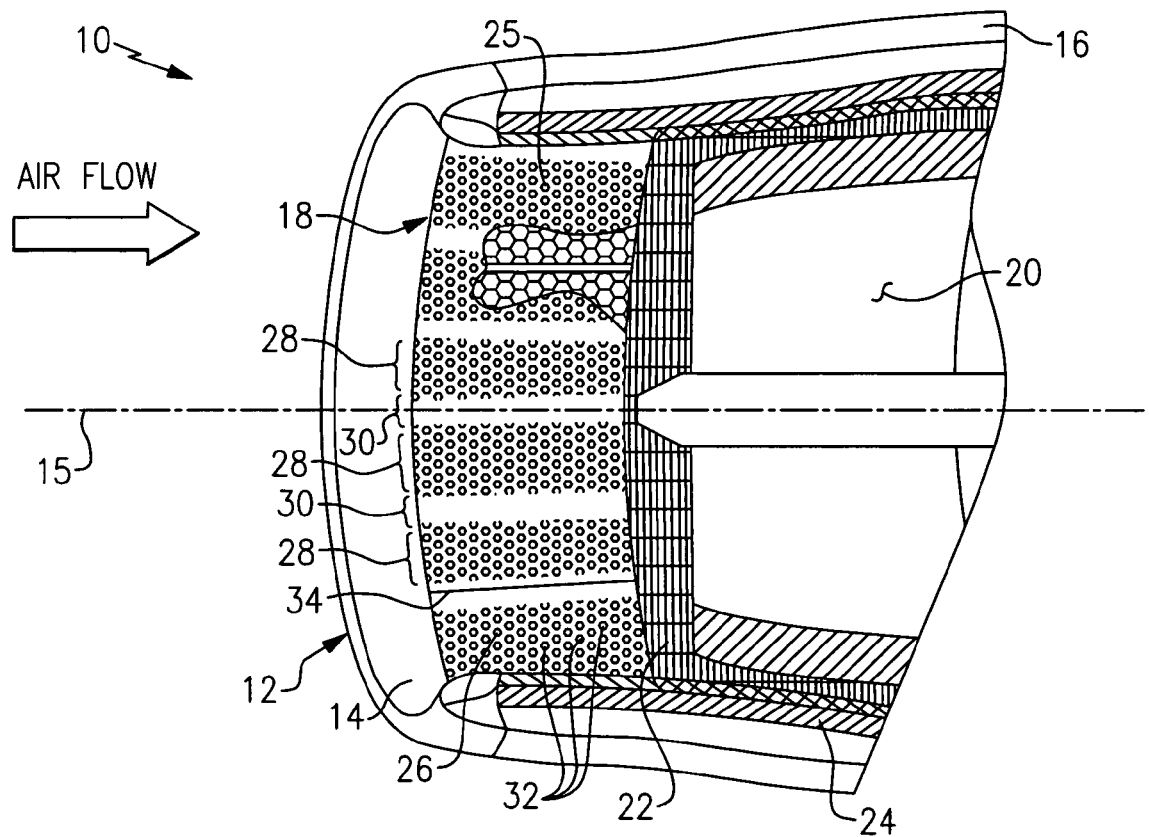
FIG. 1 is a schematic view of a housing including an example acoustic liner according to this invention.

Referring to FIG. 1, an engine housing assembly 10 includes a leading edge 12 defined by a cowling 14. The cowling 14 provides a smooth transition between an outer wall 16 and an inner surface 18 that defines an airflow path through the housing assembly 10. The housing assembly 10 surrounds and protects a plurality of rotating fan blades 20. The inner surface 18 includes a rub strip 22 adjacent the rotating fan blades 20 that protects the fan blades 20 from possible damage caused by contact.

Forward of the rub strip 22 is an acoustically active liner assembly 25. The acoustically active liner assembly 25 includes a noise attenuation layer 24. The noise attenuation layer 24 is comprised of a plurality of honeycomb structures distributed annularly about the inner surface 18 of the housing assembly 10. The noise attenuation layer 24 is covered by a protective face sheet 26. The face sheet 26 is a metal sheet that includes a plurality of openings 32. The openings 32 communicate acoustic energy through the face sheet 26 to the underlying noise attenuation layer 24 where acoustic energy is dissipated to reduce emitted noise.

The plurality of openings 32 through the face sheet 26 are arranged in noise absorption areas 28 to communicate acoustic energy through the face sheet 26 to the underlying noise attenuation layer 24. Interspersed between each of the noise absorption areas 28 are noise reflective areas 30. The noise reflective areas 30 do not include openings and do not allow the transmission of acoustic energy through the face sheet 26. Instead, the noise reflective areas 30 scatter acoustic waves of higher order modes into lower order modes. The large number of uniformly distributed noise reflective areas 30 causes the lower order modes to substantially cancel each other out.

Rotating engine fan blades create a shock related noise that propagates forwardly in the housing 10. The shock related noise is generated by a pressure field on the rotating fan blades 20. Acoustic energy generated by this phenomenon is contained in spinning acoustic modes that have circumferential orders related to the number of fan blades 20 according to the relationship:

$$m_f = nBPF \cdot B$$

Where nBPF is an integer representing the fan blade passing frequency harmonic order; and B is the number of fan blades.

The spinning acoustic modes that carry the noise do not propagate through the housing assembly 10 at lower rotational speeds of the fan blades 20 (Cut-off Modes). However, as the fan blades 20 increases in rotational speed, the acoustic modes that cause propagation of acoustic energy cuts on and propagates within the housing 10.

Although, the noise begins to propagate within the housing 10, these propagating modes are relatively high order modes that are still close to cut-off and most of their acoustic energy is concentrated near the inner surface 18 in a direction substantially normal to the inner surface 18. The spinning acoustic modes of higher orders that are close to cut-off are easily attenuated by the noise attenuation layer 24 of the acoustic liner assembly 25. However, splices 34 in the face sheet 26 that do not include openings scatter incident acoustic modes into other circumferential orders (m) according to the relationship:

$$m=m_f-k*s$$

Where s is the number of splices or non-acoustically active areas $m_f$ is the circumferential order;

m is the number of circumferential modes caused by the non-acoustically active areas; and k is an integer that can be positive or negative.

Because, the number of splices is always much smaller than the number of blades in prior art liner assemblies, the scattered modes are lower acoustic modes that propagate axially within the housing 10 and reduce the attenuation effects of the acoustic liner assembly 25.

The example acoustic liner assembly 25 of this invention includes multiple noise reflective areas 30 within the face sheet 26 that scatters high order acoustic modes caused by pressure concentrated near the rotating fan blades 20 into either even higher order modes that are easier to attenuate or into a plurality of lower acoustic modes that cancel each other out. Rather than eliminate scatter of acoustic energy of higher modes into lower modes by minimizing the number of splices 34 as is commonly attempted in prior art designs, the acoustic liner 25 according to this invention utilizes multiple noise reflective areas 30 to increase the scatter of higher order acoustic modes into a plurality of lower order acoustic modes that substantially cancel each other out and prevent low order noise propagation axially through the housing.

The multiple noise reflective areas 30 generate multiple scatterings of acoustic energy within the housing assembly 10 that cancel out the pressure field associated with lower order modes and keep the acoustic energy in the easily attenuated high order modes. The acoustic energy of higher modes is efficiently attenuated by the noise attenuation structure 24.

Figure 2:
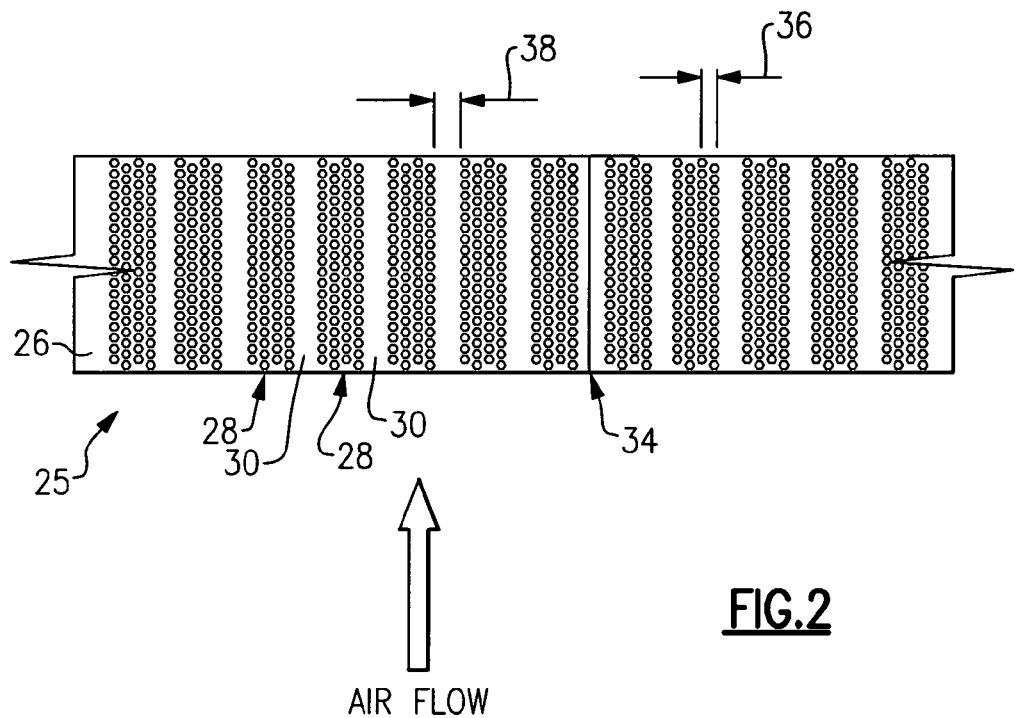
FIG. 2 is a schematic view of a portion of an example face sheet according to this invention.

Referring to FIG. 2, the noise reflective areas 30 are disposed in an axial orientation within the housing and parallel with the direction of air flow and substantially evenly spaced about an inner circumference of the housing assembly 10. The direction of airflow is perpendicular to the plane of rotation of the fan blades 20. The noise reflective areas 30 are of a width 38 that is greater than the spacing between adjacent openings 32 in the noise absorption areas 28. The width 38 of the reflective areas 30 can be equal to a width of the noise absorption areas as is illustrated in the example shown in FIG. 2, but may also be arranged in varying widths to provide a uniformly orientated repeating pattern within the housing. The width 38 of the reflective areas 30 may also be greater than the width of the nose absorption areas 28 to tailor noise attenuation to application specific requirements.

The number of noise reflective areas 30 is determined with respect to the number of fan blades 20 and operation of the engine assembly to produce the desired scattering effect that cancels the scattered low order acoustic modes.

The number of noise reflective areas 30 is related to the number of fan blades 20 and the frequency of noise desired to be cancelled. For fan blade frequency harmonic orders of BPF or lower frequencies, the number of noise reflective areas is determined according to the relationship:

$$S \geq 2B$$

where B=the number of fan blades; and

S=the number of noise reflective areas.

For fan blade frequency harmonics of 2BPF or lower frequencies, the number of noise reflective areas is determined according to the relationship:

$$S \geq 4B$$

where B=the number of fan blades; and

S=the number of noise reflective areas.

These relationships provide only modes that are of an order of $m_f$ or higher. Significant noise reduction is further provided with smaller numbers of noise reflective areas 30. For example the number of strips could be varied between S≥1.5 B for frequency harmonics of BPF, and S≥3 B for frequency harmonics of 2BPF and lower. As appreciated, the specific number of splices is determined according to a relationship accounting for the number of fan blades and the specific noise attenuation application such that the number of noise reflecting areas 30 can be varied to tailor the noise attenuation properties of the liner assembly 25.

Figure 3:
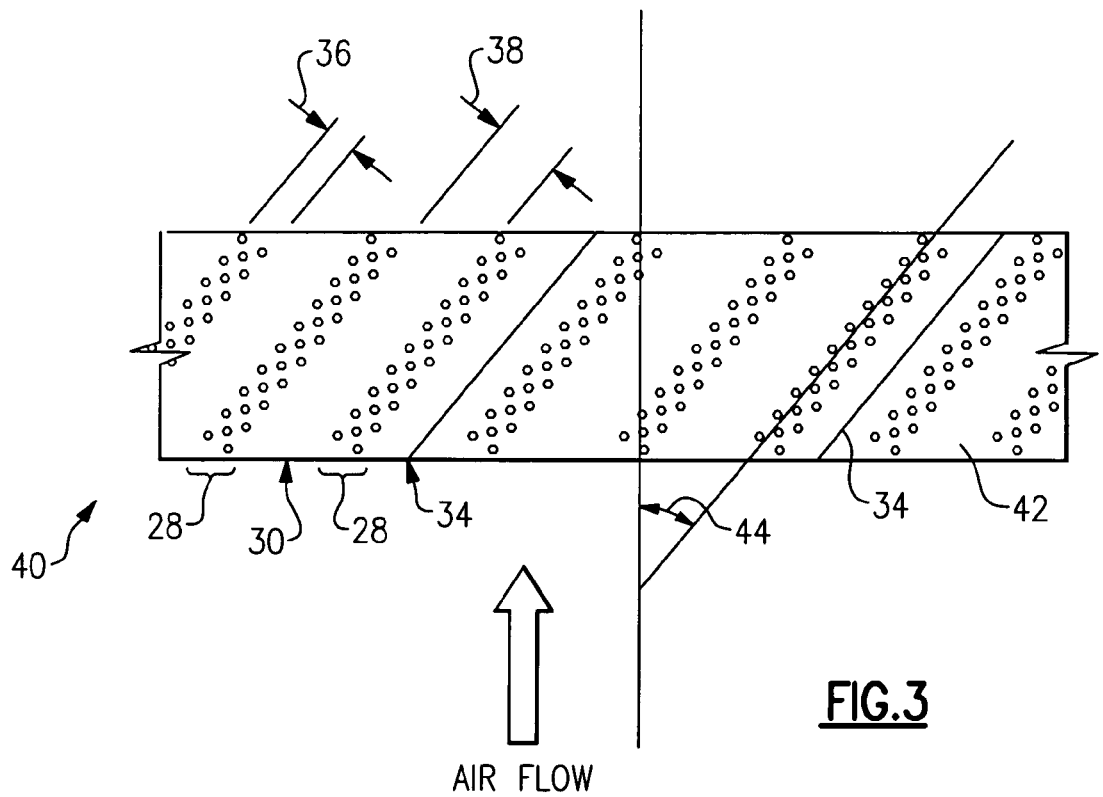
FIG. 3 is a schematic view of a portion of another example face sheet according to this invention.

Referring to FIG. 3, in another example liner assembly 40, a face sheet 42 includes the plurality of acoustically absorption areas 28 and the noise reflective areas 30 disposed at an angle 44 relative to the air flow through the housing assembly 10. The noise absorption areas 28 and noise reflective areas 30 are disposed at an angle 44 relative to the air flow to provide an angular orientation that aids in tailoring the direction in which acoustic energy is reflected back into the housing assembly 10 to provide the desired noise attenuation performance.

Accordingly, the noise attenuation liner assembly for the aircraft housing according to this invention provides for the reduction of noise emitted from the fan case housing without the accompanying complication required for creating a zero splice or completely acoustically transparent connections of sections of the face sheet utilized to cover the noise attenuation structure within the aircraft housing.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of attenuating noise within an aircraft engine housing comprising the steps of:
    a) absorbing a portion of generated acoustic energy in an acoustic energy absorption area, where the acoustic energy absorption area comprises a noise attenuation structure disposed under a face sheet portion including a plurality of openings, wherein a width of the plurality of energy absorption areas varies to provide a uniformly orientated repeating pattern within the aircraft engine housing; and
    b) scattering higher order acoustic energy at a plurality of locations into a corresponding plurality of lower orders that cancel a portion of the generated lower order acoustic energy scattered from the higher orders.

2. The method as recited in claim 1, including the step of alternating acoustic energy absorption areas with acoustic energy reflective areas about an inner surface of the engine housing, wherein each of the acoustic energy reflective areas includes a width greater than a width of the energy absorption areas.

3. The method as recited in claim 1, including the step of determining a number of acoustic energy reflective areas required for attenuating a desired frequency of acoustic energy.

4. The method as recited in claim 3, including the step of determining the number of acoustic energy reflective areas in relation to a number of fan blades rotating within the housing.

* * * * *